United States Patent [19]

Roberts

[11] Patent Number: 4,465,958
[45] Date of Patent: Aug. 14, 1984

[54] MOTOR SPEED CONTROL CIRCUIT

[75] Inventor: William J. Roberts, Toledo, Ohio

[73] Assignee: Allied Corporation, Morris Township, Morris County, N.J.

[21] Appl. No.: 371,408

[22] Filed: Apr. 26, 1982

[51] Int. Cl.³ .............................................. H02P 5/06
[52] U.S. Cl. .................................. 318/347; 318/348; 318/349
[58] Field of Search ............... 318/305, 347, 346, 348, 318/349, 357, 358, 345 B, 345 F, 345 R, 139, 493; 338/48, 129, 185

[56] References Cited

U.S. PATENT DOCUMENTS

| | | | |
|---|---|---|---|
| 3,348,113 | 10/1967 | Vichr | 318/305 X |
| 3,941,198 | 3/1976 | Kappas | 318/349 X |
| 4,008,426 | 2/1977 | Ogura | 318/345 R |
| 4,296,363 | 10/1981 | Blake et al. | 318/349 |

Primary Examiner—Ulysses Weldon
Attorney, Agent, or Firm—James P. DeClercq

[57] ABSTRACT

A control circuit for a direct current trolling motor powered by a storage battery includes a transistor placed in series between the motor and the battery, a selector switch, and one or more voltage regulating devices such as zener diodes. The selector switch includes a movable or wiper element connected to the battery, and a plurality of contacts, one of which connects the battery directly to the motor, and one of which is unconnected. At least one contact is connected to a zener diode connected to the base terminal of the transistor, to regulate the speed of the motor in a stepwise manner.

2 Claims, 1 Drawing Figure

MOTOR SPEED CONTROL CIRCUIT

The instant application is related to the field of speed control for electric motors. In particular, the instant application relates to a speed control for a direct current motor incorporated in a trolling motor assembly for use in fishing.

BACKGROUND OF THE INVENTION

Electrically-powered trolling motors are used to slowly propel a boat used in fishing through the water, to provide relative movement between the water and the bait being used, to provide a more lifelike appearance to the bait. A storage battery is used as the source of direct current power, and conventionally a tapped dropping resistor is connected between the source of direct current power and a direct current motor, coupled to a propeller. This tapped dropping resistor may be in a separate enclosure within the boat, or, in one commercially-available system, includes a tapped resistor formed by wire wound in a manner to conform to the inner surface of a housing containing the direct current motor. The housing is submerged in use, and the proximity of the wire forming the tapped resistor to the housing provides cooling for the resistor. Providing separate dropping resistors in a separate housing is both expensive and bulky, and the technique of winding wires about the inner surface of a submersible housing is difficult and costly to manufacture. The instant invention overcomes these and other deficiencies of the known prior art.

SUMMARY OF THE INVENTION

The instant invention provides a motor speed control circuit for a trolling motor by interposing a semiconductor device between a direct current motor and a source of direct current power, and controlling the semiconductor device by means of a selector switch selecting one of a plurality of voltage regulating devices to be connected between the source of direct current power and a control terminal of the semiconductor device. The semiconductor device, and the voltage regulating devices may be easily and conveniently bonded to a submersible housing, providing a simple and convenient technique for manufacturing a trolling motor assembly.

DETAILED DESCRIPTION OF THE INVENTION

Figure 1:
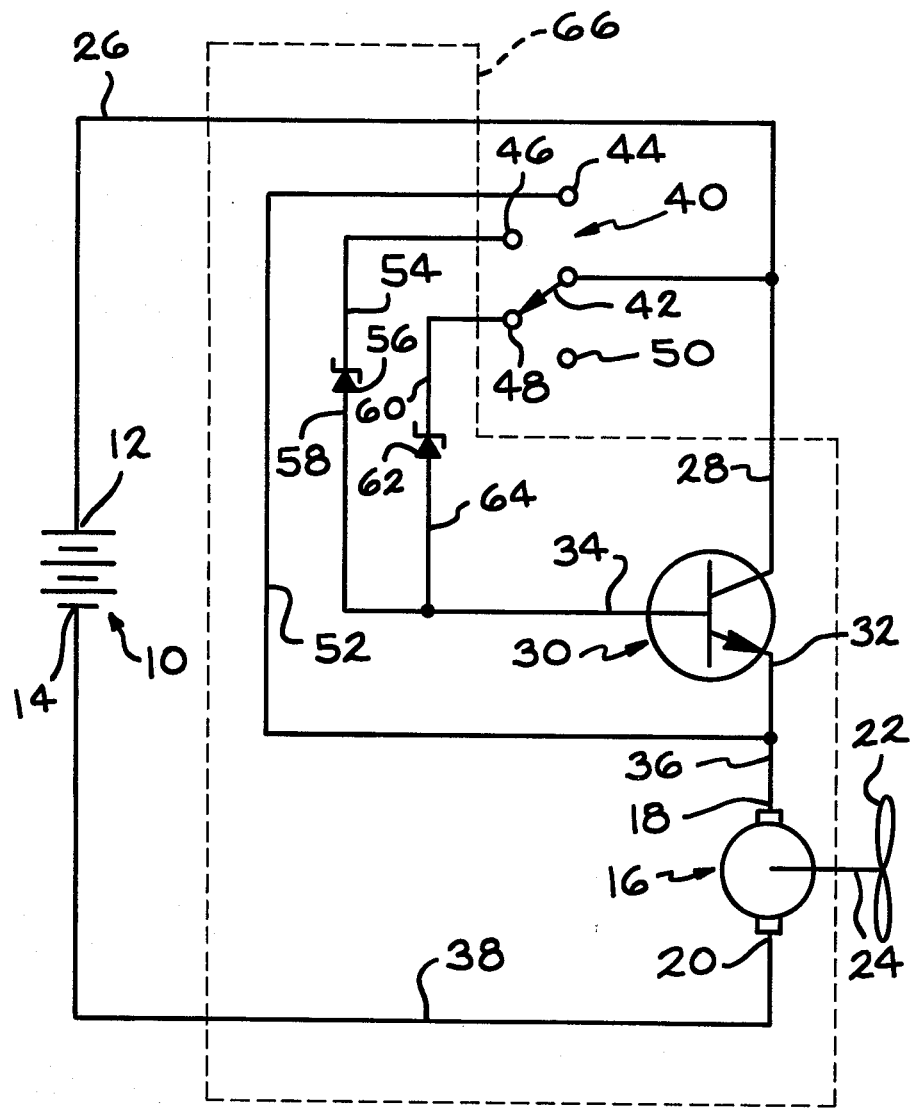
FIG. 1 is a partially schematic drawing illustrating the motor speed control circuit of the invention.

The preferred embodiment of the invention, shown in FIG. 1, includes a conventional source of direct current power, shown as a battery 10 having a first or positive terminal 12 and a second or negative terminal 14, and a direct current motor 16 having a first terminal 18 and a second terminal 20. Direct current motor 16 is shown operatively coupled to a propeller 22 by motor shaft 24. A line 26 interconnects first or positive terminal 12 with a first controlled terminal 28 of a semiconductor device 30, here shown as an NPN transistor. Semiconductor device 30 also includes a second controlled terminal 32 and a control terminal 34. As illustrated, first controlled terminal 28 is the collector of transistor 30, second controlled terminal 32 is the emitter, and control terminal 34 is the base. Terminal 32 of transistor 30 is connected to first terminal 18 of motor 16 by a line 36, and terminal 20 of motor 16 is connected to terminal 14 of battery 10 by return line 38.

A selector switch 40 is shown as including a movable or wiper element 42, electrically connected to terminal 28 of transistor 30 and to positive terminal 12 of battery 10, and a plurality of fixed contacts such as first contact 44, second contact 46, third contact 48 and fourth contact 50.

Selector switch 40 is shown with wiper element 42 contacting third contact 48. First contact 44 is connected, through a line 52 to second control terminal 32 of transistor 30, and to first terminal 18 of motor 16, so that when movable wiper element 44 is in contact with first contact 44, transistor 30 will be bypassed or shunted, providing full-speed operation of motor 16.

Second contact 44 is connected to a first terminal 54 of a voltage regulating device 56, which has its second terminal 58 connected to control terminal 34. As illustrated, voltage regulating device 56 is a zener diode having a cathode 54 and an anode terminal 58.

Third contact 48 is connected to a first terminal 60 of a voltage regulating device 62, which has a second terminal 64 connected to control terminal 34. As shown, voltage regulating device 62 is a zener diode with a cathode terminal 60 and an anode terminal 64.

A fourth contact 50 of selector switch 40 is shown unconnected. Thus, connection between wiper 42 and contact 44 provides full-speed operation, contact between wiper 42 and contact 46 provides interemediate-speed operation, contact between wiper 42 and contact 48 provides low-speed operation, and connection between wiper 42 and contact 50 de-energizes motor 16.

Preferably, voltage regulating devices 56 and 62, transistor 30 and motor 16 are disposed within a submersible housing 66, indicated symbolically in broken line.

In operation, the voltage between control terminal 34 and controlled terminal 32 is substantially constant, and is a parameter of transistor 30. The voltage across zener diode 56, or zener diode 62, is a constant, and is a parameter of the voltage regulating device chosen.

Thus as will be apparent, the voltage appearing between terminals 18 and 20 will be the voltage provided by battery 10, less that, if any, produced by zener diodes 56 or 60, and the voltage between terminals 34 and 36.

Therefore, the instant invention provides a simple, convenient, easy to manufacture and inexpensive circuit for controlling the speed of a trolling motor, with only a few simple components. Of course, the number of speeds selectable by a selector switch such as 40 may be varied by changing the number of fixed contacts, and providing additional voltage regulating devices such as zener diodes. In view of the simplicity of the preferred embodiment of the invention, it will be apparent that numerous modifications and variations of such a speed control circuit may be made without departing from the spirit and scope of the invention.

I claim:

1. A motor speed control circuit, comprising:
   a source of direct current power;
   a direct current motor;
   a semiconductor device interposed between said direct current motor and a first terminal of said source of direct current power, said semiconductor device having a first controlled terminal and a second controlled terminal and a third control terminal, said first controlled terminal being electrically connected to said source of direct current power, said second controlled terminal being electrically connected to a first terminal of said motor;

said motor having said first terminal and a second terminal, said second terminal of said motor being connected to a second terminal of said source of direct current power;

a selector switch having a movable wiper element and a plurality of fixed contacts;

said movable wiper element being electrically connected to said first terminal of said source of direct current power;

a first one of said plurality of fixed contacts being electrically connected to said second controlled terminal for shunting said semiconductor device;

a second one of said plurality of fixed contacts being connected to a first terminal of a first semiconductor voltage regulating device, a second terminal of said first semiconductor voltage regulating device being electrically connected to said third controlled terminal;

a third one of said plurality of fixed contacts being connected to a first terminal of a second semiconductor voltage regulating device, a second terminal of said second semiconductor voltage regulating device being electrically connected to said third controlled terminal;

said first semiconductor voltage regulating device having a first operating voltage and said second semiconductor voltage regulating device having a second operating voltage;

said speed control circuit being adapted to stepwise control the speed of said motor.

2. A motor speed control circuit according to claim 1, wherein:

said semiconductor device is a transistor; and said first and second semiconductor voltage regulating devices are zener diodes.

* * * * *